United States Patent [19]

Porco

[11] 4,329,716
[45] May 11, 1982

[54] COMBINATION TELEVISION PICTURE PROJECTION SCREEN UNIT AND ORNAMENTAL COVER UNIT THEREFOR

[76] Inventor: Daniel A. Porco, 1050 Fifth Ave., New York, N.Y. 10028

[21] Appl. No.: 98,705

[22] Filed: Nov. 29, 1979

[51] Int. Cl.³ .............................................. H04N 5/65
[52] U.S. Cl. .................................... 358/231; 358/255; 350/124
[58] Field of Search ................ 358/229, 231, 233, 235, 358/236, 237, 238, 239, 254, 255; 350/117, 120, 122, 123, 124, 125; 312/7 TV; 353/119; 312/204, 209, 210, 242

[56] References Cited

U.S. PATENT DOCUMENTS

| | | | |
|---|---|---|---|
| 1,904,963 | 4/1933 | Vallen | 350/124 |
| 1,988,522 | 1/1935 | Stanley | 358/254 |
| 2,528,311 | 10/1950 | Hurley | 350/117 |
| 4,021,105 | 5/1977 | Schubach | 358/237 |
| 4,051,522 | 9/1977 | Healy | 358/86 |

FOREIGN PATENT DOCUMENTS 502310  7/1952  Belgium ........................ 358/254
2110238  9/1972  Fed. Rep. of Germany ...... 358/254

Primary Examiner—Michael A. Masinick
Attorney, Agent, or Firm—Wallenstein, Wagner, Hattis, Strampel & Aubel

[57] ABSTRACT

A television picture projection screen unit comprises a screen support framework having an initially exposed projection screen surface upon which is to be projected a greatly enlarged image of the picture on the front face of a television set cathode ray tube. The screen support framework has opposite marginal portions positioned outwardly of the portions of said projection screen which are to receive the projected image. A flexible ornamental cover unit is provided comprising an ornamental, projection screen-covering portion having an ornamental face of a size to extend at least between said opposite marginal portions of the screen support framework so as to hide the projection screen from view when the projection screen is not in use. The cover unit has anchoring portions at the opposite ends thereof for anchoring the cover unit in a smooth, stretched condition over the marginal portions of the screen support framework.

10 Claims, 8 Drawing Figures

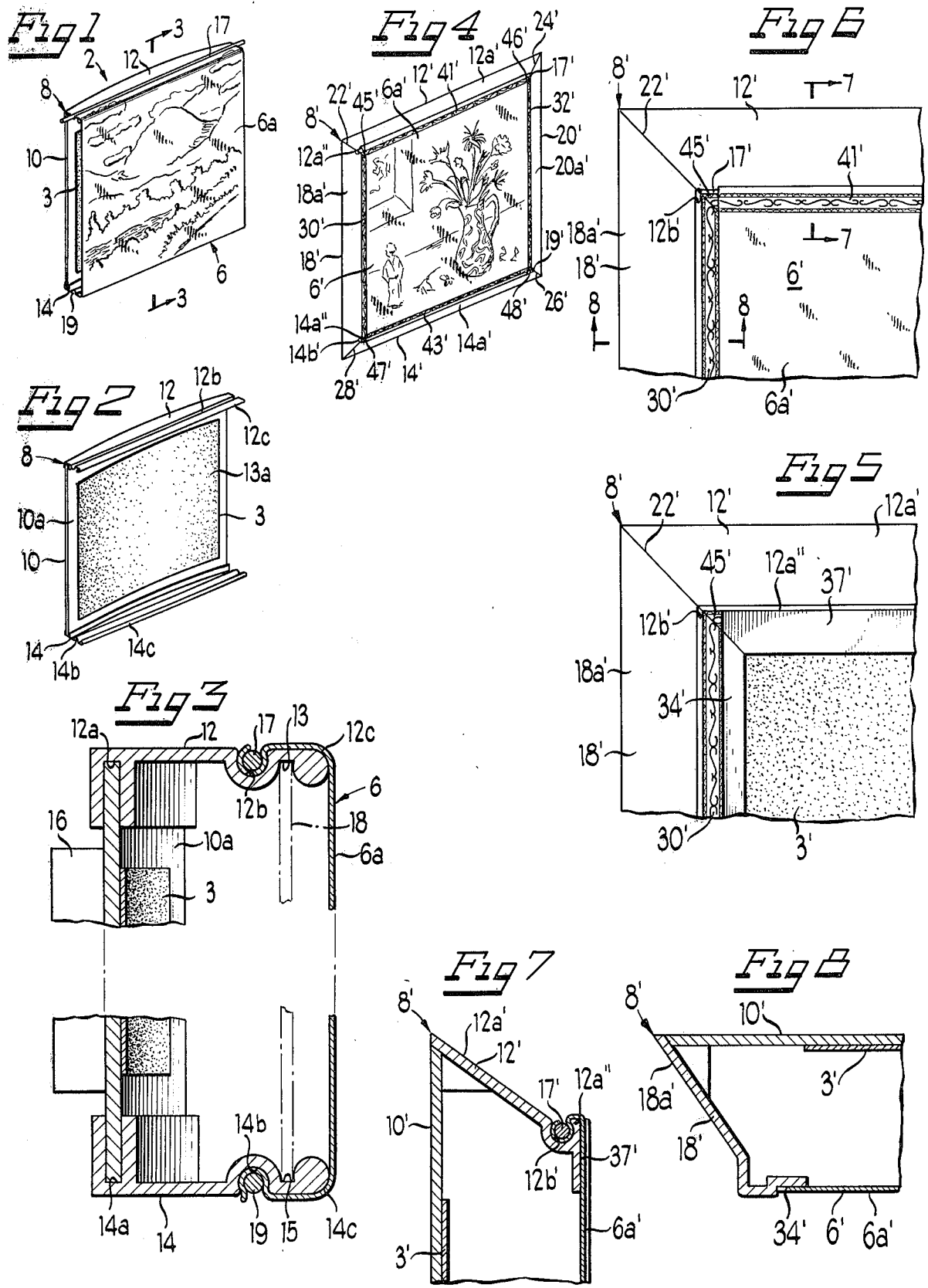

COMBINATION TELEVISION PICTURE PROJECTION SCREEN UNIT AND ORNAMENTAL COVER UNIT THEREFOR

BACKGROUND OF THE INVENTION

The present invention relates to a television picture projection screen unit commonly found in bars and upon which is projected in greatly magnified form the image on the face of a television set cathode ray tube. However, such television picture projection systems have not found substantial use in home television systems. One of the reasons believed responsible for the lack of popularity of such television picture projection systems is that the projection screen units heretofore available are large, cumbersome and unattractive. Commonly, the screen surface on such a projection screen unit is concave, and so does not lend itself to being foldable into a compact unit for storage in a closet or the like when not in use. Accordingly, television picture projection screen units normally must remain, as a practical matter, mounted on a wall where it adds a very unattractive element to the room involved. It is, accordingly, a principal object of the invention to provide a unique television picture projection screen unit which, while forming a more or less semi-permanent article in the room involved, nevertheless becomes a very attractive ornamental element in the room when the screen unit is not in use.

SUMMARY OF THE INVENTION

In accordance with one of the features of the present invention, a television picture projection screen unit is provided having a screen support framework which presents a vertical projection screen surface, preferably concave in shape, which accommodates a greatly enlarged projected image of the picture on the front face of a much smaller sized television set cathode ray tube. The screen support framework is provided with opposite marginal portions, preferably at the top and bottom thereof, adapted to receive an ornamental cover unit when the screen unit is not in use. The ornamental cover unit comprises a main ornamental portion, which may be made of cloth, cardboard or synthetic plastic material, which has on one face thereof ornamentation to resemble or constitute a piece of art work, poster, or the like, which will decorate the room in which the projection screen unit is permanently mounted. This ornamental portion of the cover unit is foldable or rollable into a compact size, and when unfolded or unrolled is of a size to cover over the exposed unattractive portion of the projection screen unit including the normally visible projection screen surface thereof. The ornamental cover unit further includes opposite marginal anchoring portions for anchoring the cover unit to the screen support framework in a smooth, stretched condition.

In the most advantageous form of the invention, the opposite marginal anchoring portions of the cover unit comprise rods extending along the opposite margins or ends of the ornamental portion of the cover unit, and the corresponding marginal portions of the screen support framework are provided with anchoring slots into which the rods are placed when the ornamental portion of the cover unit has been stretched into a smooth condition over the front of the projection screen unit.

In accordance with a preferred aspect of the invention, the screen support framework resembles a picture frame having opposite, top, bottom, left hand and right hand marginal portions, with the aforesaid slots positioned and relating to the cover unit in a manner where the cover unit blends with the marginal portions of the screen support framework, so that the support framework and ornamental cover units appear to be a framed picture.

The aforesaid and other objects, advantages and features of the invention will become more apparent upon making reference to the specification to follow, and the claims and drawings accompanying the same.

DESCRIPTION OF DRAWINGS

FIG. 1 is a perspective view of a combination television picture projection screen unit and ornamental cover unit therefor, the screen portion thereof being hidden from view by the cover unit there shown;

FIG. 2 is a perspective view of the television picture projection screen unit shown in FIG. 1, with the cover unit removed therefrom;

FIG. 3 is an enlarged, fragmentary, vertical sectional view through the combination television picture projection screen unit and ornamental cover unit therefor shown in FIG. 1, taken along section line 3—3 therein;

FIG. 4 is a perspective view of a combination television picture projection screen unit and ornamental cover unit therefor which constitutes a preferred form of the invention and wherein the screen unit resembles a picture frame;

FIG. 5 is a fragmentary elevational view through a corner portion of the screen unit shown in FIG. 4, with the cover unit removed therefrom;

FIG. 6 is a view of that portion of the screen unit shown in FIG. 5, with the cover unit mounted thereon;

FIG. 7 is a sectional view through the screen unit shown in FIG. 6, taken along section line 7—7; and FIG. 8 is a sectional view through the combination screen unit and cover unit shown in FIG. 6, taken along section line 8—8 therein.

DESCRIPTION OF EXEMPLARY FORM OF INVENTION SHOWN IN DRAWINGS

Referring now to the embodiment of the invention shown in FIGS. 1 through 3, a television picture projection screen unit 2 constructed in accordance with the present invention is shown in a condition where the normally visible projection screen 3 thereof is covered by a cover unit 6. The screen unit 2 includes a screen support framework generally indicated by reference numeral 8, which framework may include a vertical back wall 10. The wall 10 has a concave shape about a vertical axis, and presents a concave front mounting surface 10a upon which is adhesively or otherwise secured a sheet of projection screen-forming material which is fully exposed at the front of the screen unit when the cover unit 6 is removed therefrom, as shown in FIG. 2. The top and bottom margins of the vertical wall 10 are shown respectively extending into downwardly and upwardly facing curved grooves 12a–14a of top and bottom, horizontally-extending marginal walls 12-14 projecting forwardly from the margins of the vertical wall 10. The upper and bottom surfaces, respectively, of the top and bottom marginal walls 12-14 have straight depressions or rod-receiving grooves 12b–14b, respectively. These grooves extend for the full length of the upper and bottom surfaces respectively of the marginal walls 12-14 of the framework 8.

There may be secured to the rear face of the vertical wall 10 suitable mounting means for the screen unit 2, such as rearwardly and vertically extending mounting bars 16. The top and bottom marginal walls 12–14 form mounting supports for the cover unit 6. As previously indicated, the cover unit 6 may comprise a main ornamental portion 6a, which is made of flexible cloth, cardboard or synthetic plastic material which can be readily rolled or folded for compact shipment and storage. On what will be the outer face of this main flexible ornamental portion of the cover unit 6 is placed ornamentation which resembles or constitutes a piece of ornamental art work, poster or the like which would decorate the room in which the projection screen unit 2 is permanently mounted.

The flexible ornamental portion 6a of the cover unit 6 is secured to the framework 8 in a manner so that the ornamental portion 6a is smoothly stretched over the top and bottom marginal walls 12–14. To this end, rigid rods 17–19 are shown secured to the top and bottom margins of the flexible ornamental portion 6a of the cover unit 6, as by a suitable adhesive or the like. The rods 17–19 with the ends of the flexible ornamental portion 6a of the cover unit 6 encasing the same fit snugly within the rod-receiving grooves 12b–14b in the outer surfaces of the top and bottom walls 12–14 when the flexible ornamental portion 6a of the cover unit 6 is stretched smoothly over the curved forward edges 12c–14c of the walls 12–14. The resiliency of the material out of which the flexible ornamental portion 6a of the cover unit 6 is made will pull the rods 17–19 and the sections of the flexible ornamental portion 6a of the cover unit 6 encasing the same against the outwardly facing surfaces of the walls 12–14 defining the grooves 12b–14b which form holding or locking shoulders for the rods. The rods 17–19 are somewhat longer than the grooves 12b–14b so that they project slightly beyond the ends of the walls 12–14 where they can be easily grasped. Because of the flexibility of the sheet material out of which the ornamental portion 6a of the cover unit 6 is made, the cover unit can be readily removed from the screen unit 2 by grasping the projecting ends of one of the rods 17 or 19 and raising or dropping the same to stretch the material forming the flexible ornamental portion 6a of the cover unit further to permit the rod involved to be removed from the associated groove 12b or 14b.

The top and bottom marginal walls 12, in addition to being adapted to support the cover unit 6, may also have slidably received within confronting internal guideways 13–15 thereof an ornamental flexible sheet 18 which may be a cardboard poster, artwork print or the like. The guideways 13–15 open onto the lateral sides of the screen unit 2 so that the side edge portion of the ornamental sheet 18 may be fed and pushed along the guideways 13–15.

Referring now more particularly to the form of the invention shown in FIGS. 4 through 8, the modified television picture projection screen unit framework 8' there shown includes, in addition to a vertical concave back wall 10' upon the front face of which a sheet 3' of a projection screen material is secured, top and bottom marginal walls 12'–14' and left and right hand marginal walls 18'–20' which abut one another along mitered joints 22', 24', 26' and 28' at the corners of the screen unit framework 8'. The picture frame-forming marginal walls 12', 14', 18' and 20' illustrated in the drawings have main outermost portions 12a'–14a' and 18a'–20' which incline forwardly and inwardly. The top and bottom marginal walls 12'–14' have innermost front end portions 12a"–14a" extending generally horizontally. These horizontally extending wall portions 12a"–14a" have in the outer faces thereof horizontally extending, straight rod-receiving grooves 12b'–14b' which respectively extend for the full lengths of the top and bottom marginal walls 12'–14'. The forwardmost ends of the left marginal side walls 18'–20' have on the forwardly facing sides thereof vertical ornamental stripes 30'–32' respectively. The inner front margins of the marginal side walls 18'–20' terminate in vertical, rearwardly recessed, forwardly facing, cover unit backing wall surfaces like 34'. Similarly, the inner front margins of the top and bottom marginal walls 12'–14' terminate in rearwardly recessed, forwardly facing, cover unit backing wall surfaces like 37' which are in the same vertical plane as the cover unit backing wall surfaces 34'.

FIGS. 4 and 6 show a cover unit 6' covering over the sheet 3' of projection screen material which would be otherwise exposed within the marginal portions of the framework 8. The cover unit 6' has a flexible ornamental portion 6a', like the ornamental portion 6a previously described. The top and bottom ends of the ornamental portion 6a' of the cover unit 6' is secured around rods 17'–19' which fit within rod-receiving grooves 12b'–14b' in the top and bottom marginal walls 12'–14' of the framework 8'. The width of the flexible ornamental portion 6a' of the cover unit 6' is such that the marginal portions thereof will lie against the cover unit backing wall surfaces 34' and 37' and terminate ate the margins thereof, so that the edges of the ornamental portion 6a' of the cover unit 6 are completely covered by the marginal portions of the framework 8'. The rods 17'–19', with the flexible ornamental portion 6a' of the cover unit 6 extending therearound, fit snugly within the grooves 12b'–14b' when the ornamental portion 6a' is in a taut condition. The area of the front face of the ornamental portion 6a' of the cover unit 6' which is located just forwardly of the grooves 12b'–14b' may be provided with horizontally extending stripes 41'–43' which match the vertical stripes 30'–32' formed on the marginal side walls 18'–20' so that the ornamental portion 6a' at these points blend in with the top and bottom marginal walls 12' and 14' of the framework 8'. Aligned with these stripes 41'–43' on the front face of the top and bottom marginal walls 12'–14' are short horizontal stripe portions 45'–45' and 47'–48' which intersect and form horizontal extensions of the vertical stripes 30'–32' of the marginal side walls 18' and 20'.

The ends of the rods 17'–19' are cut at an angle at their ends so that they terminate along the mitered joints 22'–24' and 26'–28' respectively at the corners of the framework 8'. The ends of these rods may also be provided with holes for receiving the pointed ends of suitable cover unit removing tools (not shown) which project into these holes to permit an upward or downward force to be applied to the rods 17'–19' to remove the same from the associated grooves 12b'–14b'.

It is apparent that the present invention has provided a unique television picture projection screen unit and ornamental cover unit therefor which enable the permanent mounting of a screen unit within a room and the selective covering or uncovering thereof in a manner where the screen unit can form an attractive ornamental addition to the room when the ornamental cover unit is mounted thereon.

It should be noted that numerous modifications may be made in the most preferred forms of the invention without deviating from the broader aspects thereof.

I claim:

1. In combination, a television picture projection screen unit comprising: a screen support framework having a vertical exposable projection screen surface therein upon which is to be projected a greatly enlarged image of the picture on the front face of a television cathode ray tube or the like, and opposite marginal portions positioned outwardly of the portions of said projection screen surface which are to receive the projected image; and a removable ornamental cover unit mounted on said framework and comprising a flexible foldable or rollable ornamental projection screen covering portion having an ornamental face stretched across said opposite marginal portions of said screen support framework so as to hide from view said projection screen surface when the screen surface is not in use, and opposite marginal anchoring portions engaged with receiving means on said support framework for making a releasable connection therewith.

2. The combination of claim 1 wherein said receiving means on said screen support framework are apertures and said anchoring portions on said cover unit are rods secured to opposite end portions of said ornamental projection screen covering portion of said cover unit which fit into said apertures when the ornamental portion of said cover unit is in its smooth stretched condition.

3. The combination of claim 2 wherein said opposite marginal portions of said screen support framework contain said apertures extending parallel to the opposite margins of said screen support framework and said anchoring rods extend parallel to the opposite margins of said cover unit and fit into said apertures so that the tension applied to said ornamental portion of said cover unit pulls the rods in locking relation against the forwardmost defining walls of said slots.

4. The combination of claim 1 wherein said projection screen surface has a concave shape.

5. The combination of claims 1, 2 or 4 wherein said receiving means on the opposite marginal portions of said screen support framework are respectively on the top and bottom marginal portions of said screen support framework.

6. The combination of claim 1 wherein there are opposite top and bottom and opposite left and right-hand marginal portions of said screen support framework which resemble a picture frame, said ornamental projection screen covering portion of said cover unit being smoothly stretched over one of said opposite marginal picture frame-forming portions of said screen support framework.

7. The combination of claim 6 wherein said opposite marginal portions of said screen support framework over which said ornamental projection screen covering portion of said cover unit is stretched are the top and bottom marginal portions of said screen support framework.

8. The combination of claim 1 or 6 wherein said opposite marginal portions of said screen support framework over which said ornamental projection screen covering portion of said cover unit is stretched are the top and bottom marginal portions of said screen support framework, and said receiving means on said screen support frame are horizontally extending apertures in said top and bottom marginal portions of said support frame and said opposite anchoring portions of said cover unit being rods which fit into said apertures on the wall support framework.

9. The combination of claim 6 wherein said ornamental projecting screen covering portion of said cover unit is ornamental at the margins thereof in a manner to blend with said opposite marginal picture frame-forming portions of said screen support framework, so that the areas of said ornamental projection screen covering portion passing over said opposite marginal picture frame-forming portions appear like a part thereof.

10. The combination of claim 1 wherein said receiving means on said screen support framework are spaced confronting guideways for slidably receive a flexible ornamental sheet.

* * * * *